(12) United States Patent
Webster et al.

(10) Patent No.: US 12,277,461 B2
(45) Date of Patent: Apr. 15, 2025

(54) MOUNTED TOKEN SYSTEM AND TRACKING

(71) Applicant: Sharing Solace LLC, Olathe, KS (US)

(72) Inventors: Crystal Webster, Olathe, KS (US); Kyle Webster, Olathe, KS (US)

(73) Assignee: Sharing Solace LLC, Olathe, KS (US)

( * ) Notice: Subject to any disclaimer, the term of this patent is extended or adjusted under 35 U.S.C. 154(b) by 0 days.

(21) Appl. No.: 18/671,044

(22) Filed: May 22, 2024

(65) Prior Publication Data

US 2024/0311601 A1    Sep. 19, 2024

Related U.S. Application Data

(60) Division of application No. 16/708,004, filed on Dec. 9, 2019, now Pat. No. 12,001,903, which is a continuation of application No. 15/919,406, filed on Mar. 13, 2018, now Pat. No. 10,504,016.

(51) Int. Cl.
| | |
|---|---|
| *G06K 19/06* | (2006.01) |
| *G06K 19/00* | (2006.01) |
| *G06K 19/04* | (2006.01) |
| *G06K 19/07* | (2006.01) |
| *H04W 4/029* | (2018.01) |
| *H04W 4/80* | (2018.01) |

(52) U.S. Cl.
CPC ......... *G06K 19/005* (2013.01); *G06K 19/047* (2013.01); *G06K 19/0727* (2013.01); *H04W 4/029* (2018.02); *H04W 4/80* (2018.02)

(58) Field of Classification Search
CPC ............... G06K 19/005; G06K 19/047; G06K 19/0727; H04W 4/029; H04W 4/80
See application file for complete search history.

(56) References Cited

U.S. PATENT DOCUMENTS

| | | | | |
|---|---|---|---|---|
| 5,418,942 | A * | 5/1995 | Krawchuk | G06F 16/93 |
| 5,544,321 | A * | 8/1996 | Theimer | H04L 67/62 |
| | | | | 380/258 |
| 6,072,392 | A * | 6/2000 | Henderson | G08B 15/004 |
| | | | | 367/198 |
| 2008/0079581 | A1 * | 4/2008 | Price | G06Q 10/08 |
| | | | | 340/568.1 |

* cited by examiner

*Primary Examiner* — Jamara A Franklin
(74) *Attorney, Agent, or Firm* — HOVEY WILLIAMS LLP

(57) ABSTRACT

A mounted token system is configured to be worn by a wearer as a part of the grieving process. The mounted token system may include a token with an tracking indicator, a token mount, and a server. The token mount includes an anterior segment which includes an anterior opening, and a posterior segment moveable relative to the anterior segment. The token mount is configured to secure the token therein. At least a portion of the token is visible from an anterior side through the anterior opening. The server performs the following steps: present, to a first user via a graphical user interface, an invitation to provide information indicative of the tracking indicator of the token; receive, from the first user, information indicative of the tracking indicator; and store information indicative of the tracking indicator. The token may then be passed to a subsequent wearer, utilizing a new token mount.

7 Claims, 9 Drawing Sheets

MOUNTED TOKEN SYSTEM AND TRACKING

RELATED APPLICATIONS

This divisional patent application claims priority benefit, with regard to all common subject matter, of co-pending and commonly assigned U.S. patent application Ser. No. 16/708,004 (the '004 Application), filed Dec. 9, 2019, and entitled "MOUNTED TOKEN SYSTEM AND TRACKING," as well as commonly assigned U.S. Pat. No. 10,504,016 (the '016 Patent), filed on Mar. 13, 2018. The '004 Application and the '016 Patent are hereby incorporated by reference in their entireties into the present application.

BACKGROUND

1. Field

Embodiments of the invention relate to jewelry and memorial tokens. More specifically, embodiments of the invention are related to a mounted token with a tracking system.

2. Related Art

The grieving process can be long and difficult for many individuals. Various items and methods exist in the prior art for helping individuals through the grieving process. The items include various memorial trinkets as a memorial to the person, item, or event that induced the grief. These items do not allow for growth or change through the grieving process. Further, these items do not add a sense of community to support the griever. What is lacking in the prior art is an item that allows for change and growth through the grieving process and allows the griever to be connected to others grieving.

SUMMARY

Embodiments of the invention solve the above-mentioned problems by providing a mounted token system. The mounted token system allows the wearer to add and remove a token from a token mount. The allows the wearer to change the mounted token system during wear, which is often a long process. The token includes a token indication that allows the token to be tracked between subsequent wearers. The tracking allows for formation of a token tree, so that subsequent wearers can view and be encouraged by the success of previous wearers.

A first embodiment of the invention is directed to a mounted token system configured to be worn by a wearer, comprising a token and a token mount. The token mount includes an anterior segment on an anterior side and a posterior segment on a posterior side moveable relative to the anterior segment. The token mount is configured to secure the token between the anterior segment and the posterior segment. The anterior segment includes an anterior opening. At least a portion of the token is visible from the anterior side through the anterior opening.

A second embodiment of the invention is directed to a mounted token system configured to be worn by a wearer, comprising a token, a token mount, and a server. The token presents a tracking indicator. The token mount is configured to secure the token. The server has a non-transitory computer readable storage medium with a computer program stored thereon which instructs at least one processor to perform the following steps: present, to a first user via a graphical user interface, an invitation to provide information indicative of the tracking indicator of the token; receive, from the first user, information indicative of the tracking indicator; store information indicative of the tracking indicator; present, to a second user via a graphical user interface at a subsequent time, an invitation to provide information indicative of the tracking indicator of the token; receiving, from the second user, information indicative of the tracking indicator; and associate the first user with the second user based upon the common tracking indicator, indicative that the token passed from the first user to the second user.

A third embodiment of the invention is directed to a mounted token system configured to be worn by a wearer, comprising a token, a token mount, and a server. The token has an associated tracking indicator. The token mount includes an anterior segment on an anterior side (which includes an anterior opening), and a posterior segment on a posterior side moveable relative to the anterior segment. The token mount is configured to secure the token between the anterior segment and the posterior segment. At least a portion of the token is visible from an anterior side through the anterior opening. The server has a non-transitory computer readable storage medium with a computer program stored thereon which instructs at least one processor to perform the following steps: present, to a first user via a graphical user interface, an invitation to provide information indicative of the tracking indicator of the token; receive, from the first user, information indicative of the tracking indicator; and store information indicative of the tracking indicator.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
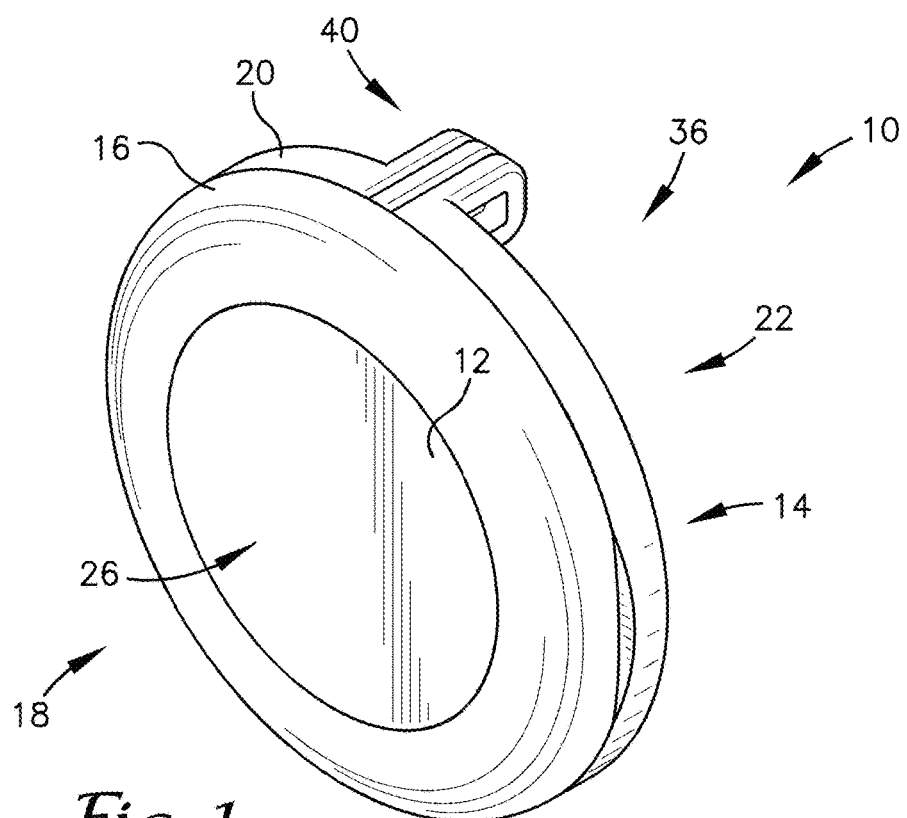
FIG. 1 is a perspective view, shown from a generally anterior side, of a mounted token system of one embodiment of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Before turning to the figures, an exemplary field of use will be discussed. It should be appreciated that various embodiments of the invention could be used in any of numerous fields. The below discussion provides an exemplary field of use, to ease the understanding of the reader. However, this use should not be construed as limiting on the invention.

Embodiments of the invention are directed to a mounted token system 10 configured for use in the field of grieving assistance. During the grieving process, a token 12 may be used by a griever (e.g., a wearer or a user) as a symbol of the person, object, event, or other grief-inducer. The token may be given to the griever by another, purchased by the griever, left to the griever by a dying person. The token is given with a token mount 14. The token mount allows the user to show, wear, retain, or otherwise be reminded of the token. The token mount may take any of various forms (examples of which are provided below) and may be suited to the habits, style, interests, and other subjective attributes of the wearer.

The token may be seen by the wearer as a manifestation of the grief, a manifestation of the grief inducer, or serve some other psychological purpose. As a step in the grieving process, the person may release themselves of the token. This can include giving the token to another person that is grieving (for the same or some unrelated reason), storing the token in another location where it cannot be seen, or performing some other task with the token as a symbolic gesture. The wearer may then continue to wear the token mount absent the token as a reminder of the lack of the token. For example, the empty token mount may be seen by the wearer as a reminder of the giving or putting away of the token, as an aid to the continued grieving process.

Figure 13:
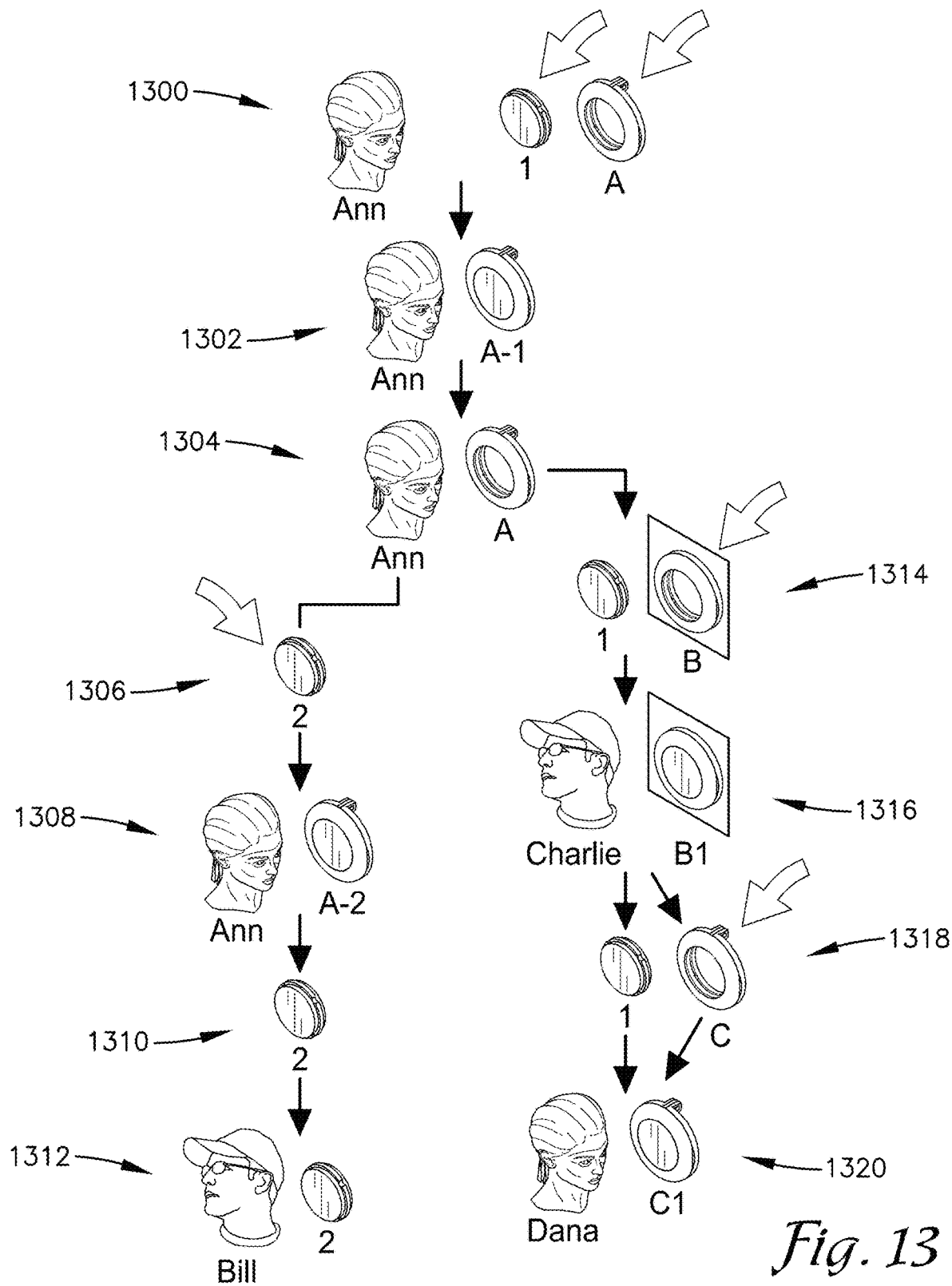
FIG. 13 is an exemplary usage flow chart, showing how various components of the mounted token system are acquired and passed.

Turning to FIG. 1, a mounted token system 10 is shown. The mounted token system 10 is configured to secure a token 12 within, on, adjacent to, or otherwise be associated with a token mount 14. The mounted token system 10 is configured to be worn by an original wearer. The original wearer may then remove the token 12 from the mounted token system 10 and give the token 12 to a subsequent wearer (as shown in FIG. 13 and discussed more below). The original wearer may also provide a new token mount 14 (such as in another form than the original token mount 14). The original wearer may then wear the token mount 14 without the token 12, wear the token mount 14 with a new or different token 12, or provide the token mount 14 to the subsequent wearer with the token 12.

Figure 9:
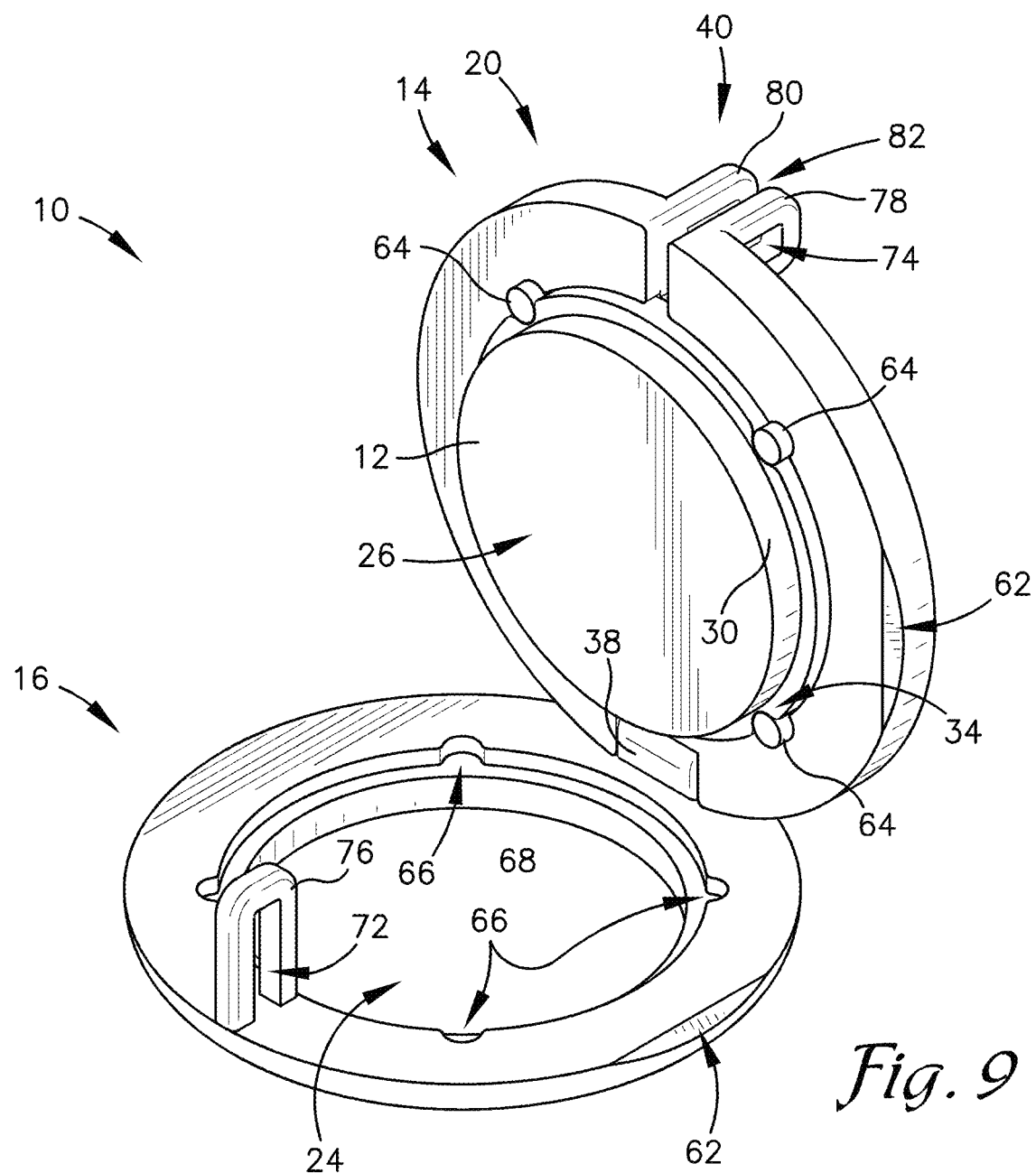
FIG. 9 is a perspective view of the mounted token system of FIG. 1, shown with a token mount shown in an open configuration with a token on a posterior side.
Figure 11:
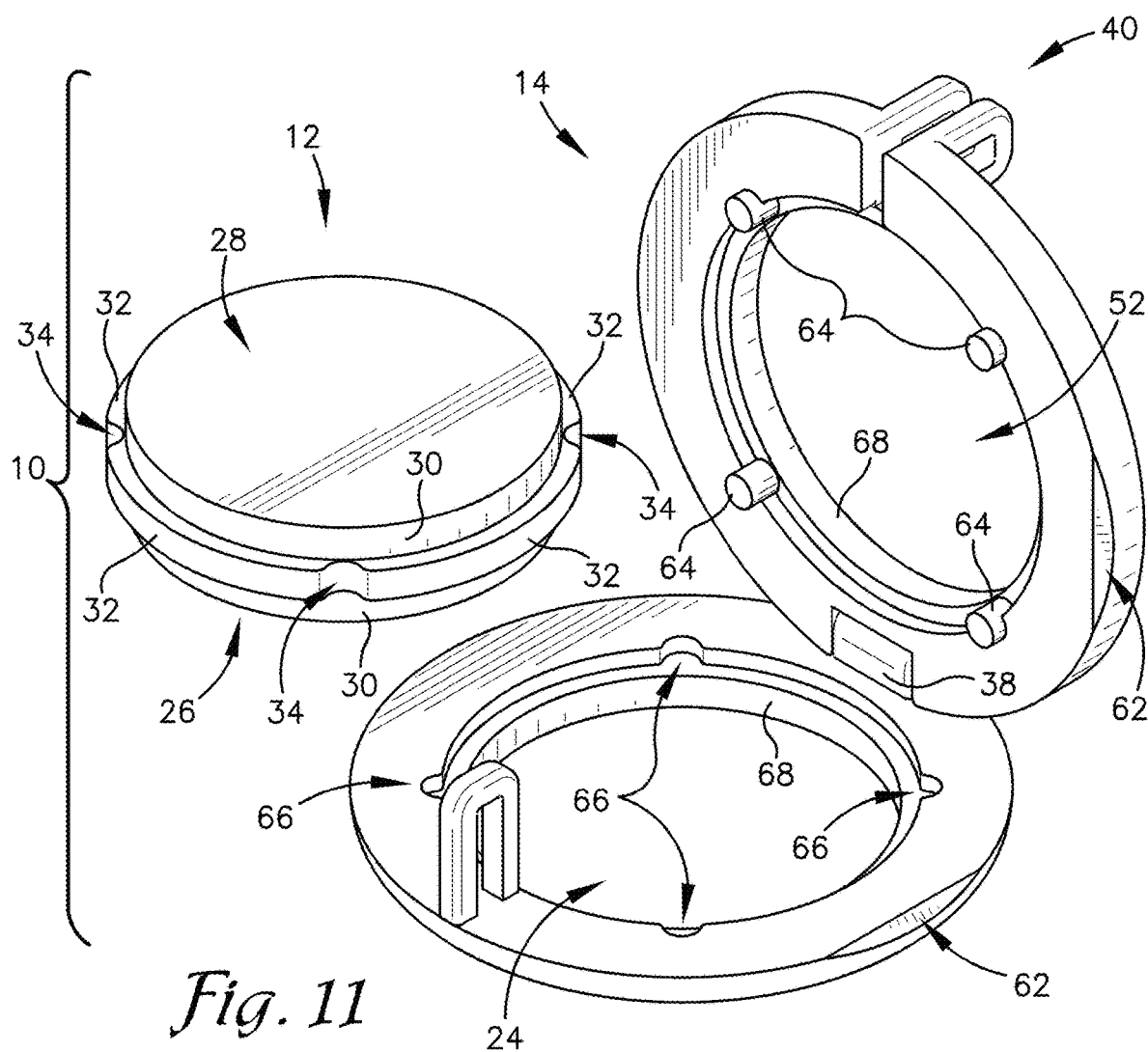
FIG. 11 is an exploded view of the mounted token system of FIG. 9, with the token removed.

In embodiments of the invention, the mounted token system 10 is configured to be worn by a wearer, and includes the token 12 and the token mount 14. The token mount 14 includes an anterior segment 16 on an anterior side 18, and a posterior segment 20 on a posterior side 22. The anterior segment 16 includes an anterior opening 24 (as best illustrated in FIGS. 9 and 11) so as to display at least a portion of the token 12 from an anterior side 18. The posterior segment 20 is moveable relative to the anterior segment 16. The token mount 14 is configured to secure the token 12 between the anterior segment 16 and the posterior segment 20. As used herein, "anterior" is used to refer to a side that is generally configured to be displayed and/or face outward (e.g., toward an observer), and "posterior" is used to refer to a side that is generally hidden against the wearer.

In various embodiments of the invention, the token 12 may take any of numerous shapes and sizes. The token 12 may include an aesthetic design thereon (not illustrated). In embodiments of the invention, the aesthetic design is a standardized or general design. This allows for the aesthetic design to apply equally to more than one wearer. This facilitates the passing of the token 12 to another wearer as a step of the grieving process. It should also be appreciated that in some embodiments, the aesthetic design appears on the token mount 14.

In other embodiments, the aesthetic design may be based upon the specific event, person, or thing that induced the grief. For example, if the grief is based upon the death of a person, the aesthetic design may include one or more initials for that person (and/or a name of that person or a colloquial term for that person, such as "mom"). As another example, the aesthetic design may show a picture of the person, a zodiac sign of the person, a hobby of the person, a symbol of the person, or other indication of the person. In these embodiments, the aesthetic design may be changeable such that a subsequent wearer can update or modify the aesthetic design to suit their specific grief-inducer.

In embodiments of the invention, the token 12 presents a tracking indicator. The tracking indicator allows for the token 12 to be assigned or otherwise associated with a specific wearer. The tracking indicator may be a number, a word, an alphanumeric sequence, a symbol, a one-dimensional bar code, a two-dimensional bar code (such as a QR CODE), or other representation. In some embodiments, the tracking indicator may be engraved into the token 12, printed on the token 12, attached to a sticker on the token 12, painted on the token 12, or otherwise visually affixed to the token 12. In other embodiments, the tracking indicator may be a Radio Frequency Identification ("RFID") tag, a BLUETOOTH tag, or other electronic tag that is configured to be read or analyzed by an external computing device.

Figure 2:
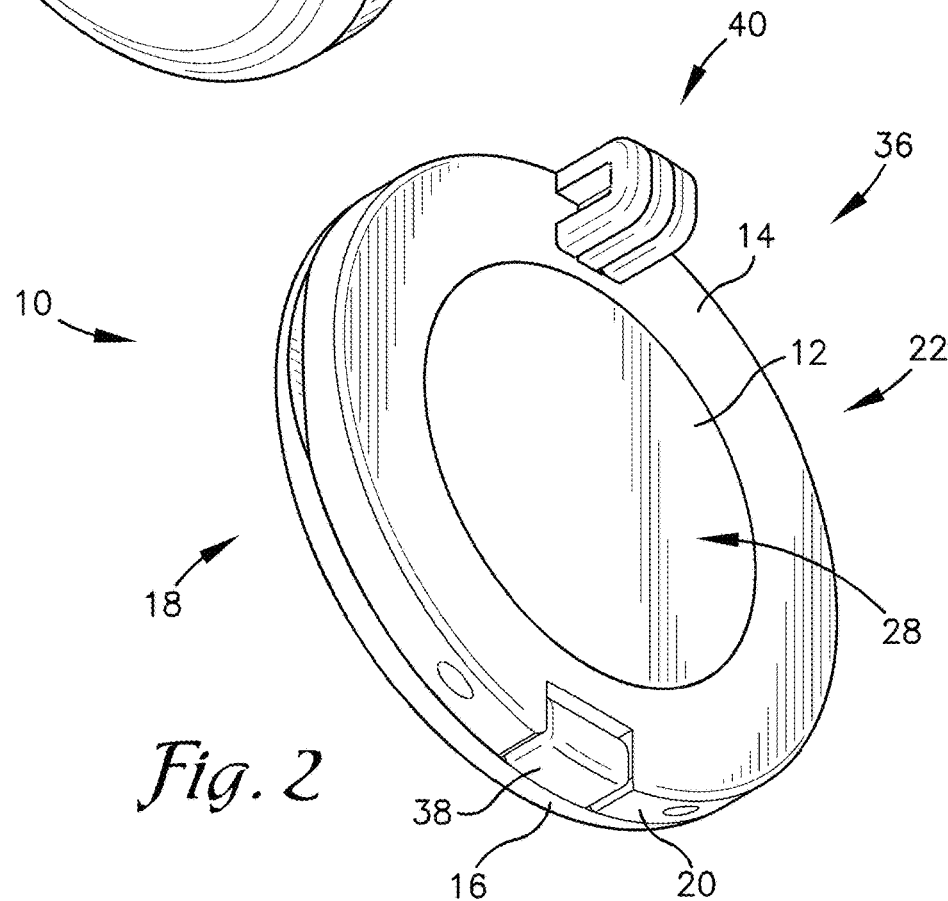
FIG. 2 is a perspective view, shown from a generally posterior side, of the mounted token system of FIG. 1.
Figure 10:
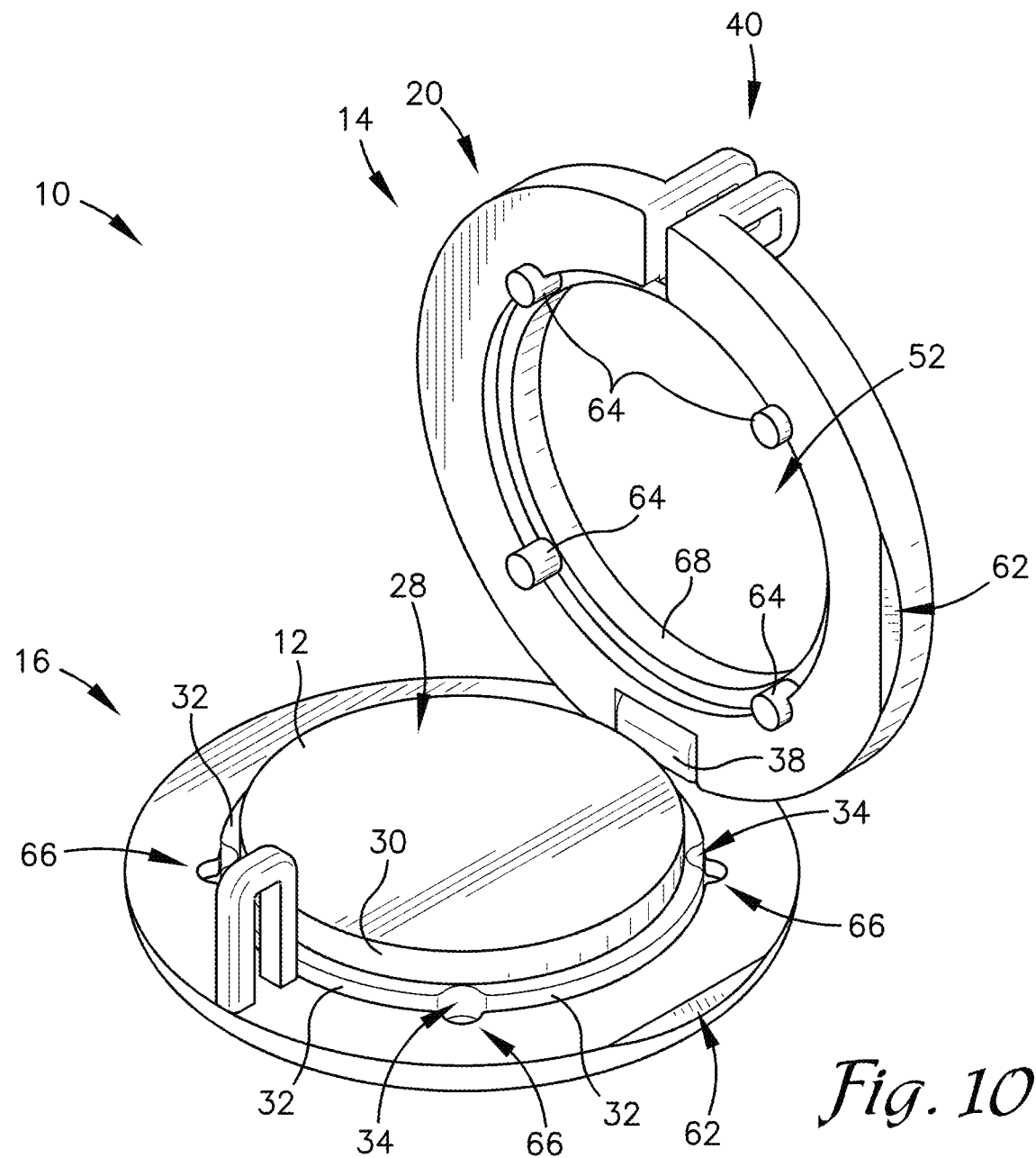
FIG. 10 is a perspective view of the mounted token system of FIG. 9, with the token on an anterior side.

In some embodiments, such as illustrated in FIGS. 9-11, the token 12 presents a substantially flattened cylinder shape. The flattened cylindrical shape includes an anterior face 26 (as best illustrated in FIG. 1), a posterior face 28 (as best illustrated in FIG. 2), a rounded wall 30. (as best illustrated in FIGS. 9-11). The token 12 may also present various hardware configured to interface with and be secured by the token mount 14. For example, the token 12 may present at least one arcuate ridge 32 along the rounded wall 30. Two arcuate ridges 32 present an alignment token recess 34 (as discussed more below) therebetween. The arcuate ridges 32 allow the token mount 14 to secure the token 12 therein, while the at least a portion of the token mount 14 is flush with the anterior face 26 and/or the posterior face 28 of the token 12.

In some embodiments, the anterior face 26 presents the aesthetic design and the posterior face 28 presents the tracking indicator. This is because the aesthetic design is configured to be presented outward (e.g., the anterior side 18) and the tracking indicator is configured to only be used by the wearer in tracking the token 12 (as discussed more below). In other embodiments, the token 12 may present a tracking indicator without any aesthetic design. In these embodiments, the tracking indicator may be disposed on the anterior side 18, disposed on the posterior side 22, or be non-visible.

It should be appreciated that in embodiments of the invention, various tokens 12 all have the same size and shape. This allows the token 12 to be taken and added to another type of token mount 14. A token 12 having a standardized size and shape may be referred to as a universal token, configured to be selectively secured by a first token mount 14 and to be selectively secured by a second token mount 14 (wherein the first token mount 14 is of a different type than the second token mount 14).

The token mount 14 will now be discussed in more detail. The token mount 14 is configured to secure the token 12 therein or thereon. The token mount 14 may take any of numerous forms. As discussed above, different wearers may desire to keep, wear, display, or otherwise be associated with the token 12. As such, numerous forms of token mount 14 are contemplated, each performing the function of securing the token 12. Shown in FIGS. 1-12 is a pendent 36 for a necklace. This is only one exemplary form of the token mount 14. A few exemplary forms of the token mount 14 will be discussed, to provide the reader with an idea of the different forms of token mounts 14 that may be used in various embodiments of the invention, but these should not be considered limiting. In embodiments of the invention, the token mount 14 may take one or more of the following forms: pendent-style necklaces, dog-tag-style necklaces, bracelets, anklets, wrist cuffs, key chains, money clips, worry stones, figurines, statues, crosses, stuffed animals, rings, cell phone cases, cell phone charms, urns, cuff links, bookmarks, lobster clasp charms, credit-card-sized keepsakes, belt buckle, earrings, journals, home décor, and other items.

Figure 5:
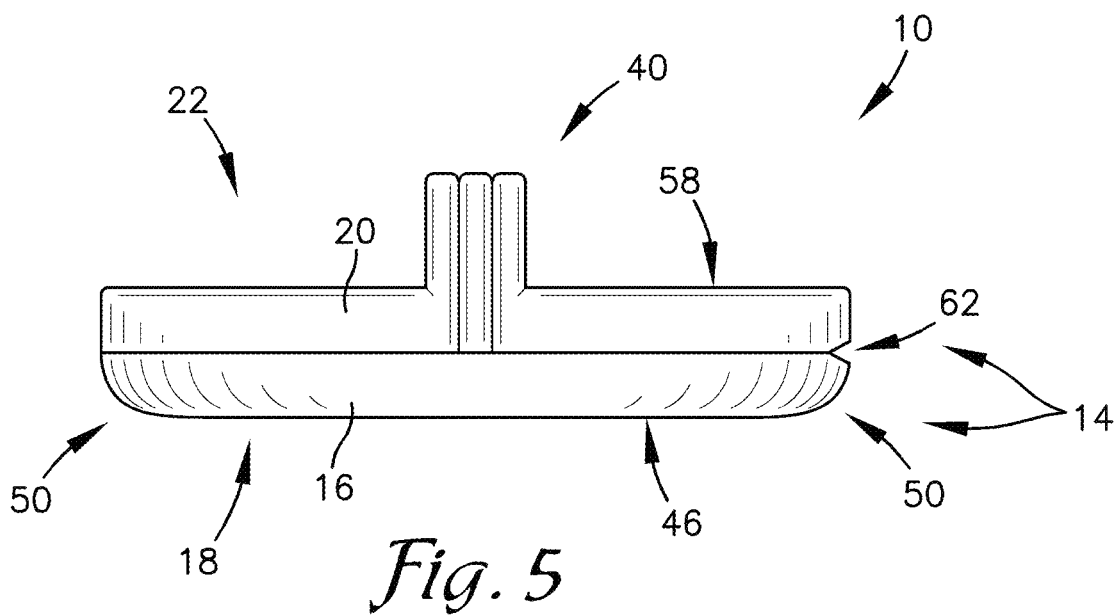
FIG. 5 is a top view of the mounted token system of FIG. 1.
Figure 6:
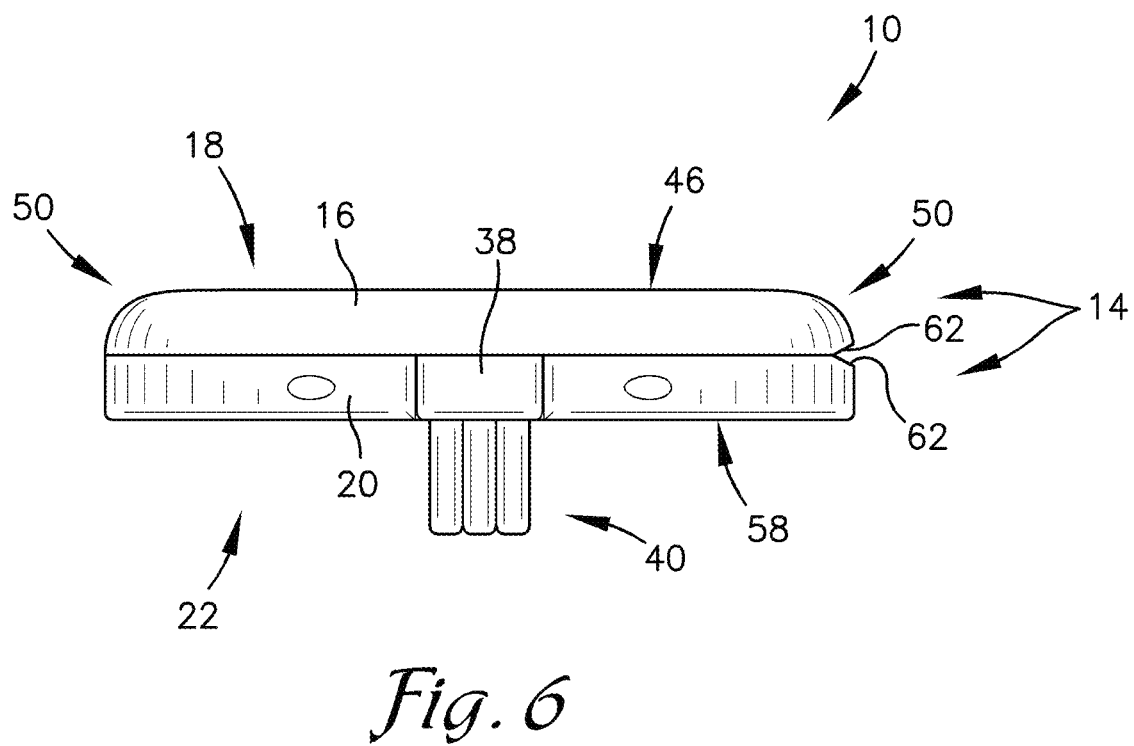
FIG. 6 is a bottom view of the mounted token system of FIG. 1.

In embodiments of the invention, the token mount 14 comprises the anterior segment 16 and the posterior segment 20. In some embodiments, the token mount 14 further comprises a pivot 38 and a lock 40, as discussed below. The token mount 14 is configured to secure the token 12 between the anterior segment 16 and the posterior segment 20. It should be appreciated that "anterior" and "posterior" as used herein refer to the general sides upon which the respective segments 16, 20 are disposed. A portion of the anterior segment 16 may be disposed on a posterior side 22 of the token 12 (as shown in FIG. 5), or vice versa.

When in a closed position (as shown in FIGS. 1-8), the token 12 is at least partially surrounded by the anterior segment 16 and the posterior segment 20. The closed position is that in which the anterior segment 16 is adjacent to, proximate to, parallel with, or otherwise in a securing position relative to the posterior segment 20. An open position (as shown in FIGS. 9-11) is that in which at least a portion of the anterior segment 16 is separated from the posterior segment 20 such that the token 12 may be removed from the token mount 14. In embodiments of the invention, the token mount 14 moves between the closed position and the open position by moving about the pivot 38. In embodiments, the token mount 14 is retained in the closed position by the lock 40.

Figure 12:
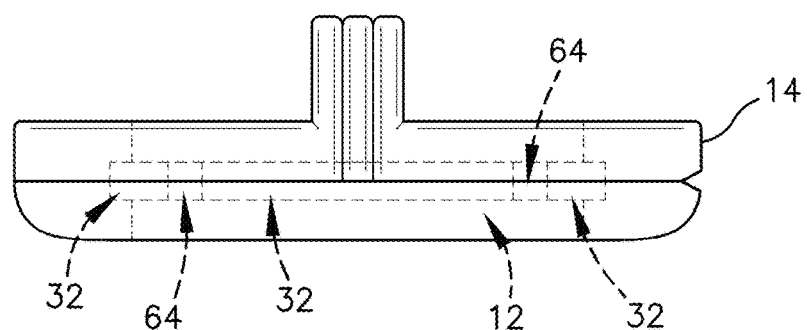
FIG. 12 is a top view of the mounted token system of FIG. 1, showing the token within the token mount.

The anterior segment 16 is disposed at least partially on the anterior side 18 when the token mount 14 is in the closed position. The anterior segment 16 covers at least a portion of the token 12 or is otherwise configured to retain the token 12 against the posterior segment 20. The anterior segment 16 may fully surround the token 12, as illustrated in FIGS. 1 and 12, or may surround a lesser extent of the token 12.

In embodiments of the invention, the anterior side 18 presents the anterior opening 24. The anterior opening 24 allows an observer, such as the wearer or other person, to observe the token 12 therethrough. The anterior opening 24 may be a hole, a recess, a channel, or other structure that allows at least a portion of the token 12 to be seen therethrough. In other embodiments, the anterior opening 24 instead presents a space or a gap between two or more components of the anterior side 18 (such that at least a portion of the token 12 may be viewed through the space). The term "opening" as used herein, should therefore not be construed as requiring a hole through a single surface. The opening, as used herein, need only allow for at least a portion of the token 12 to be seen.

Figure 3:
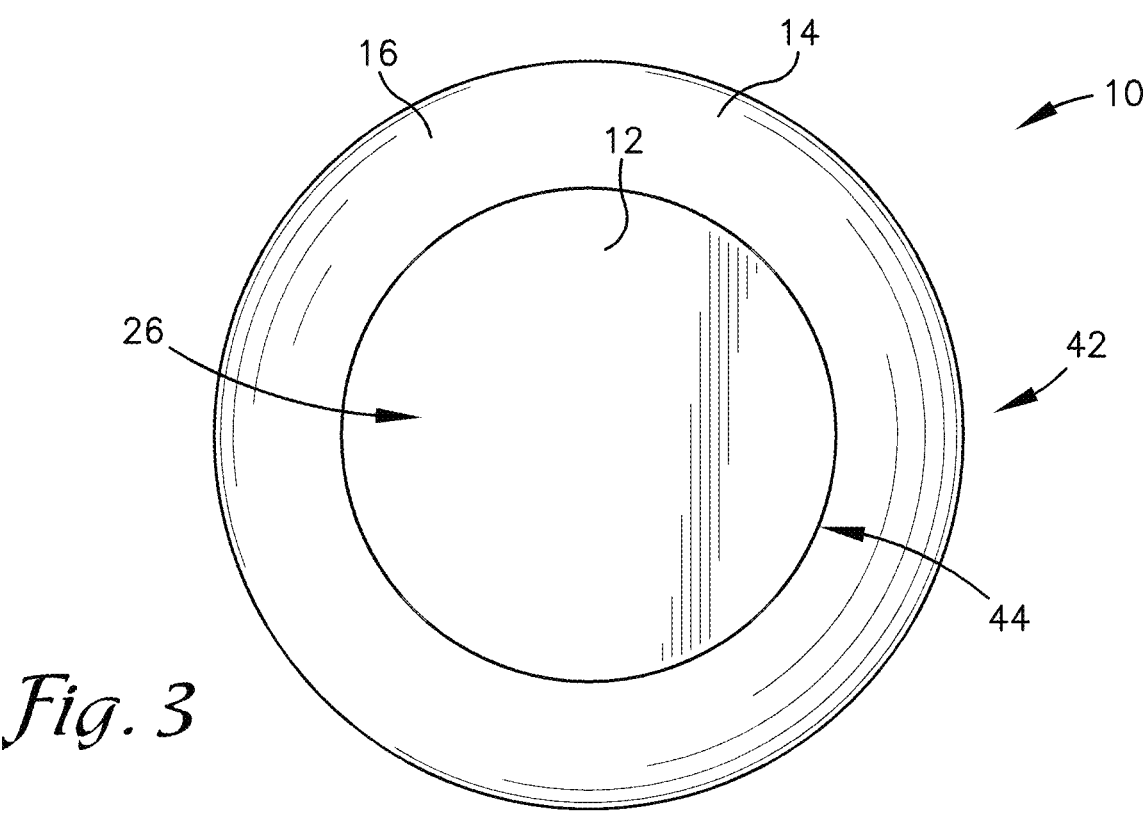
FIG. 3 is a front view of the mounted token system of FIG. 1.
Figure 4:
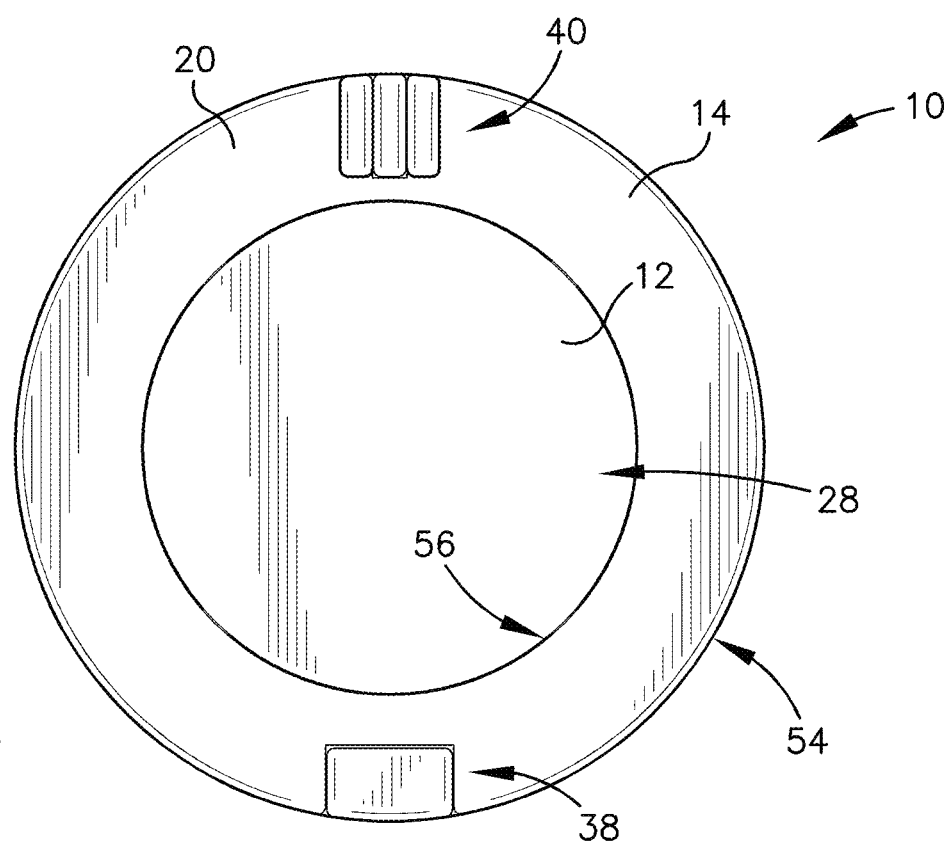
FIG. 4 is a rear view of the mounted token system of FIG. 1.

In embodiments of the invention, the anterior segment 16 of the token mount 14 presents a generally annular shape, as best illustrated in FIG. 3. The annular shape includes an outer wall 42, an inner wall 44, an external face 46, and an internal face 48 (as best illustrated in FIG. 9). The external face 46 and the internal face 48 are each substantially annular shaped. The external face 46 and the internal face 48 each traverse between the inner wall 44 and the outer wall 42. The external face 46 may include a decorative edge 50 (such as a beveled or arcuate interface with the external wall, as illustrated in FIGS. 5-8). In some of these embodiments, the anterior opening 24 is disposed within the annular shape (e.g., defined by the inner wall 44).

The posterior segment 20 is disposed at least partially on the posterior side 22 when the token mount 14 is in the closed position. The posterior segment 20 may include or be associated with any of the various items discussed above for a form of the mounted token system 10. The posterior segment 20 may fully surround the token 12, as illustrated in FIG. 12, or may surround a lesser extent of the token 12.

In some embodiments of the invention, the posterior side 22 presents a posterior opening 52. The posterior opening 52 allows an observer, such as the wearer, to observe the token 12 therethrough from the posterior side 22. The posterior opening 52 may be a hole, a recess, a channel, or other structure that allows at least a portion of the token 12 to be seen therethrough. In other embodiments, the posterior opening 52 instead presents a space or a gap between two or more components of the anterior side 18 (such that at least a portion of the token 12 may be viewed through the space). The term "opening" as used herein, should therefore not be construed as requiring a hole through a single surface. The opening, as used herein, need only allow for at least a portion of the token 12 to be seen. In other embodiments, not illustrated, the posterior segment 20 is substantially continuous such that there is no posterior opening.

In embodiments of the invention, the posterior segment 20 of the token mount 14 presents a generally annular shape. The annular shape includes an outer wall 54, an inner wall 56, an external face 58, and an internal face 60. The external face 58 and the internal face 60 are each substantially annular shaped. The external face 58 and the internal face 60 each traverse between the inner wall 56 and the outer wall 54. The external face 58 may include a decorative edge (not illustrated, such as a beveled or arcuate interface with the external wall). In some of these embodiments, the posterior opening 52 is disposed within the annular shape (e.g., defined by the inner wall 56).

In embodiments of the invention, the anterior segment 16 and/or the posterior segment 20 may include a cleave face 62, as best illustrated in FIGS. 5, 6, 8 and 11. The cleave face 62 is disposed along the internal face 48, 60 (of the anterior segment 16 and/or the posterior segment 20). The cleave face 62 is disposed at a bevel to the interior face and/or the outer wall 42, 54. The cleave face 62 is configured to allow a fingernail or other relatively flat object to wedge between the anterior segment 16 and the posterior segment 20, and force (e.g., cleave) the anterior segment 16 away from the posterior segment 20.

In embodiments of the invention, the token mount 14 is configured to keep the token 12 in a certain alignment relative to the token mount 14. This may include alignment structures on the token 12, the anterior segment 16, and/or the posterior segment 20. These structures may prevent the token 12 from moving laterally and/or rotationally relative to the token mount 14, about any of various axes. For example, the structures may prevent all lateral motion of the token 12, as well as preventing yaw, pitch, and roll. The structures may lock the token 12 into a certain position and orientation. The token 12 may have a certain set orientation, or may be configured to be placed into any of a plurality of orientations relative to the token mount 14. For example, as best illustrated in FIGS. 9 and 10, the token 12 may be placed into any of four roll orientations. As another example, not directly illustrated, the token 12 may be placed into the token mount 14 either with the anterior face 26 toward the anterior side 18 or with the anterior face 26 toward the posterior side 22. Other orientations may also be possible with other shapes of tokens and token mounts 14. These various orientations may have significance to the wearer in the grieving process.

In embodiments of the invention, at least one of the anterior segment 16 and the posterior segment 20 includes an alignment protrusion 64. The alignment protrusion 64 is configured to keep the token 12 in a set orientation relative to the token mount 14. FIGS. 9-11 illustrate an embodiment in which the alignment protrusion 64 is disposed on the posterior segment 20. In the illustrated example, four alignment protrusions 64 extend from the posterior segment 20 (as best illustrated in FIG. 10) generally toward an anterior side 18 (when the token mount 14 is in a closed configuration, as shown in FIG. 12). In other embodiments, not illustrated, the alignment protrusion 64 extends from the anterior segment 16. In still other embodiments, some combination of the above is used to lock the token 12 into a certain orientation.

In embodiments of the invention, the token 12 presents the alignment token recess 34 that is complementary to the alignment protrusion 64. The alignment token recess 34 presents an opening, a channel, a depression, or other structure configured to receive the alignment protrusion 64 therein. In embodiments of the invention, the alignment token recess 34 is disposed along an outer arcuate edge of the token 12. For example, the alignment token recess 34 may be disposed between two respective arcuate ridges 32 and abut the rounded wall 30 of the token 12. In embodiments in which the alignment protrusion 64 presents a cylinder shape (as shown in FIGS. 9-11), the alignment token recess 34 may present a semi-circular shape.

In embodiments of the invention, the anterior segment 16 presents an alignment mount recess 66. The alignment mount recess is complementary to the alignment protrusion 64 so as to keep the anterior segment 16 aligned with the posterior segment 20. In embodiments of the invention, the alignment mount recess is disposed along an inner wall 44 of the anterior segment 16. Like the alignment token recess 34, the alignment mount recess may present a semi-circular shape. As such, the alignment token recess 34 and the alignment mount recess may form a fully circular recess, as can be seen in FIG. 10.

In embodiments of the invention, the anterior segment 16 and/or the posterior segment 20 present an annular protrusion 68 that extends inward into the anterior opening 24 and/or the posterior opening 52, respectively. The annular protrusion 68 is complementary to the arcuate ridge 32 of the token 12. As such, in the closed position, the annular protrusion 68 secures the token 12 in place.

In embodiments of the invention, the pivot 38 is secured to the anterior segment 16 and to the posterior segment 20. The pivot 38 is configured to allow the anterior segment 16 to pivot relative to the posterior segment 20. In some embodiments, the pivot 38 is a component of the anterior segment 16 and/or the posterior segment 20. For example, in FIG. 2, it can be seen that the pivot 38 is a component of the anterior segment 16, to which the posterior segment 20 is pivotably attached. The pivoting may be performed about a pin (not illustrated) a traversing segment, or other structure.

The token mount 14 may be retained in the closed position using the lock 40, which may comprise any of numerous structures. For example, the token mount 14 may be retained in the closed position by a lock, a pin, a clamp, a clip, a threaded fastener, an expanding fastener, a necklace chain, a jump ring, a split ring, or other mechanical structure. As another example, the token mount 14 may be retained in the closed position by a chemical adhesive that may be removed to allow for opening. As yet another example, the token mount 14 may be retained in the closed position by a magnet.

Figure 7:
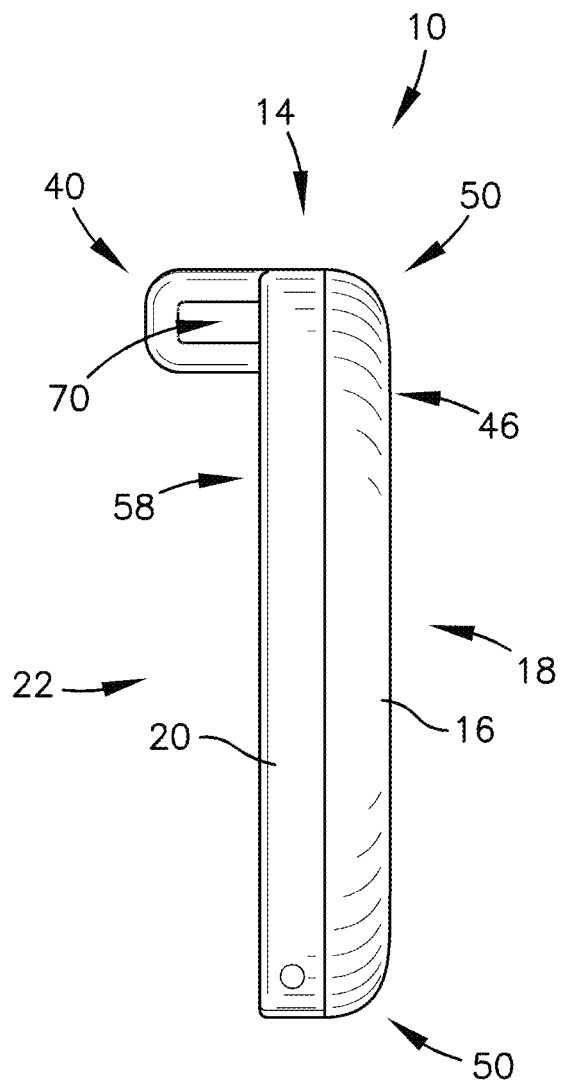
FIG. 7 is a right-side view of the mounted token system of FIG. 1.
Figure 8:
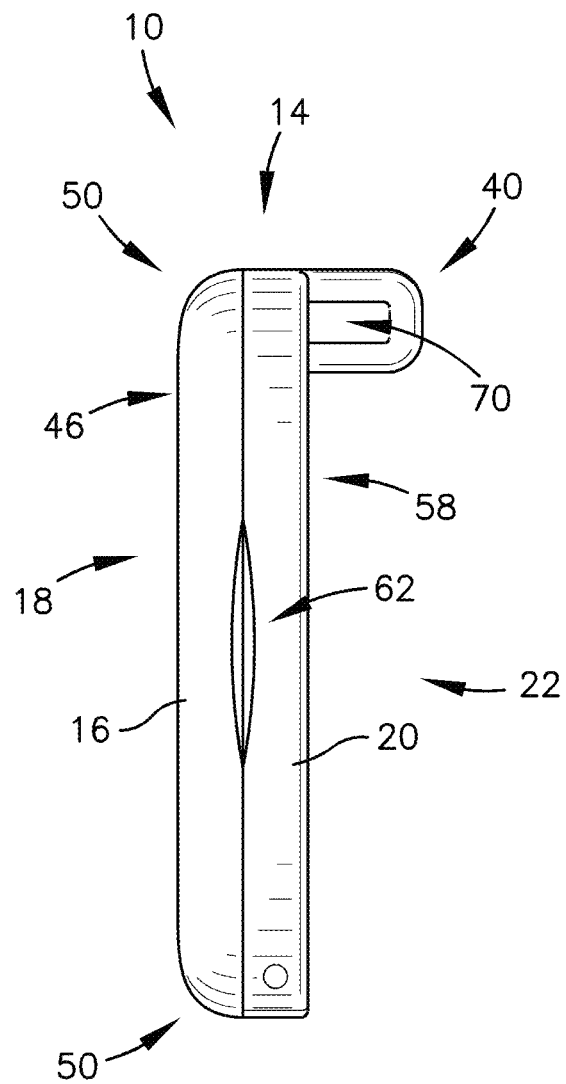
FIG. 8 is a left-side view of the mounted token system of FIG. 1.

One exemplary lock 40 for retaining the token mount 14 in the closed position is best illustrated in FIGS. 1, 2, 4, 6-9. This type of structure may be referred to as an alignment eye 70, as best illustrated in FIGS. 7 and 8. Various eyes (as discussed below) are aligned on the token mount 14. This allows a chain, strap, ribbon, or other band to be passed through the aligned eyes. The band retains the alignment of the eyes by physically preventing them from becoming unaligned.

In embodiments of the invention, as best illustrated in FIG. 9, the anterior segment 16 presents an anterior segment eye 72, and the posterior segment 20 presents a posterior segment eye 74. The token mount 14 is configured to secure the anterior segment 16 to the posterior segment 20 by aligning the anterior segment eye 72 with the posterior segment eye 74 and passing an object (such as the chain, strap, ribbon, or band) therethrough.

In some of these embodiments, the anterior segment eye 72 is disposed on an anterior eye protrusion 76 extending from the posterior side 22 of the anterior segment 16. As such, the anterior eye is aligned traverse to the anterior side 18 and the posterior side 22 (e.g., parallel a pitch axis). A first posterior eye is disposed on a first posterior eye protrusion 78 extending from the posterior side 22 of the posterior segment 20, and a second posterior eye is disposed on a second posterior eye protrusion 80 extending from the posterior side 22 of the posterior segment 20. The first posterior eye protrusion 78 is separated from the second posterior eye protrusion 80 by a channel 82. The channel 82 is configured to receive the anterior eye protrusion 76 therein. In the closed configuration, the anterior eye protrusion 76 is disposed between the first posterior eye protrusion 78 and the second posterior eye protrusion 80.

The method of using the mounted token system 10 will now be discussed in more detail. An example of the flow and usage of various components of the mounted token system 10 are shown in FIG. 13. As was discussed above, embodiments of the invention are configured to assist in the grieving process. Other embodiments of the invention may be used to assist in other processes. For example, some embodiments of the invention may be used for the passing of generational gifts, such as at weddings, religious ceremonies, graduations, retirements, and other life events.

The example, as shown in FIG. 13, proceeds as follows. In Step 1300, the original wearer, Ann in this example, purchases Token 1 and Mount A. Mount A may be the pendant type of token mount 14 as shown in FIGS. 1-12 or be of another type not illustrated. In Step 1302, Ann inserts Token 1 into Mount A and wears or otherwise uses the assembled mounted token system 10. In Step 1304, Ann removes Token 1 from Mount A and wears or otherwise uses only Mount A. This may be performed as a step of the grieving process as a symbol or rite of healing. Token 1 may then be given to another person (as discussed below), stored, or otherwise utilized.

In Step 1306, Ann acquires another token, namely Token 2. This may be performed upon a new grief-inducing event in Ann's life, upon a renewed sense of grief from the original grief-inducing event, or for another reason. In Step 1308, like in Step 1302 above, Ann inserts Token 2 into Mount A. Ann then wears or otherwise utilizes the complete mounted token system 10 of Token 2 and Mount A. In Step 1310, Ann removes Token 2 from Mount A. In Step 1312, Ann gives Token 2 to Bill to assist in Bill's grieving process. Bill may then utilize Token 2 with or without a token mount 14.

In Step 1314, Ann purchases Mount B to go with Token 1. Mount B may be selected as a type of token mount 14 that would specifically appeal to Charlie, the intended recipient of Token 1. For example, as a pendent 36 necklace (such as Mount A) may not appeal to Charlie, Ann may select a wallet (such as Mount B) for Charlie. As another example, Ann may present only Token 1 to Charlie and present him with options for different types of token mounts 14.

In Step 1316, Mount B and Token 1 are given or sold to Charlie. Charlie (or Ann) emplaces Token 1 into Mount B. Charlie may then wear or otherwise utilize the combined mounted token system 10 of Token 1 and Mount B. After a time, at Step 1318, Charlie may remove Token 1 from Mount B. Charlie may purchase yet another token mount 14 (such as Mount C). In Step 1320, Charlie may gift or otherwise transfer Mount C and Token 1 to Dana. This allows Dana to wear or otherwise utilize the mounted token system 10 that is a combination of Token 1 and Mount C.

As such, Token 1 has been sequentially utilized by Ann, Charlie, and Dana. Token 1 is also related to Token 2, in that both were at one time worn by Ann. Therefore Ann, Bill, Charlie, and Dana are all associated through a "token tree," as is shown in Illustration 13. The grieving processes of Ann, Bill, Charlie, and Dana may therefore be associated. For example, Bill may not know Dana, but both may be grieving simultaneously (as indicated by their position on FIG. 13). The electronic system described below may introduce, group, or otherwise associate Bill and Dana to assist each other.

Depending on the context, any of the above exemplary persons may be referred to as an "original wearer," an "original user," a "subsequent wearer," a "subsequent user," an "intermediate wearer," or an "intermediate user." Further, the above exemplary steps in which various components of the mounted token system 10 may be purchased, sold, gifted, and otherwise transferred are merely provided to give examples of some uses of the mounted token system 10. Other uses may also be within the scope of the invention.

In embodiments of the invention, the tracking indicator is configured to be entered by the wearer into an electronic resource, such that the token 12 may be tracked as it is passed to a future wearer. To continue the example from FIG. 13, when in Step 1300 Ann purchased or otherwise acquired Token 1, Ann may have entered the tracking indicator into the electronic resource (such as by entering an alphanumeric code into the electronic resource, taking a photograph of the tracking indicator, having the retailer scan the tracking indicator, or other entering the tracking indicator). Ann may then enter information about herself, demographic information, her grieving process, the grief inducer, and other qualitative and/or quantitative information about Ann.

Subsequent wearers or users of Token 1, Charlie and/or Dana, may thereafter enter the tracking indicator into the same or an associated electronic resource. The electronic resource may then allow Charlie and/or Dana to enter the above-discussed information into the electronic resource. The electronic resource may also (before, during, or after the entry of personal information) display at least a portion of the information entered by Ann and other previous users and wearers. This allows subsequent users to see a "token chain" of previous users. This lends importance to the token 12, encouraging the subsequent user to treat the token 12 with care and then actually pass it on to another subsequent user (and thus become, themselves, and intermediate user).

Figure 14:
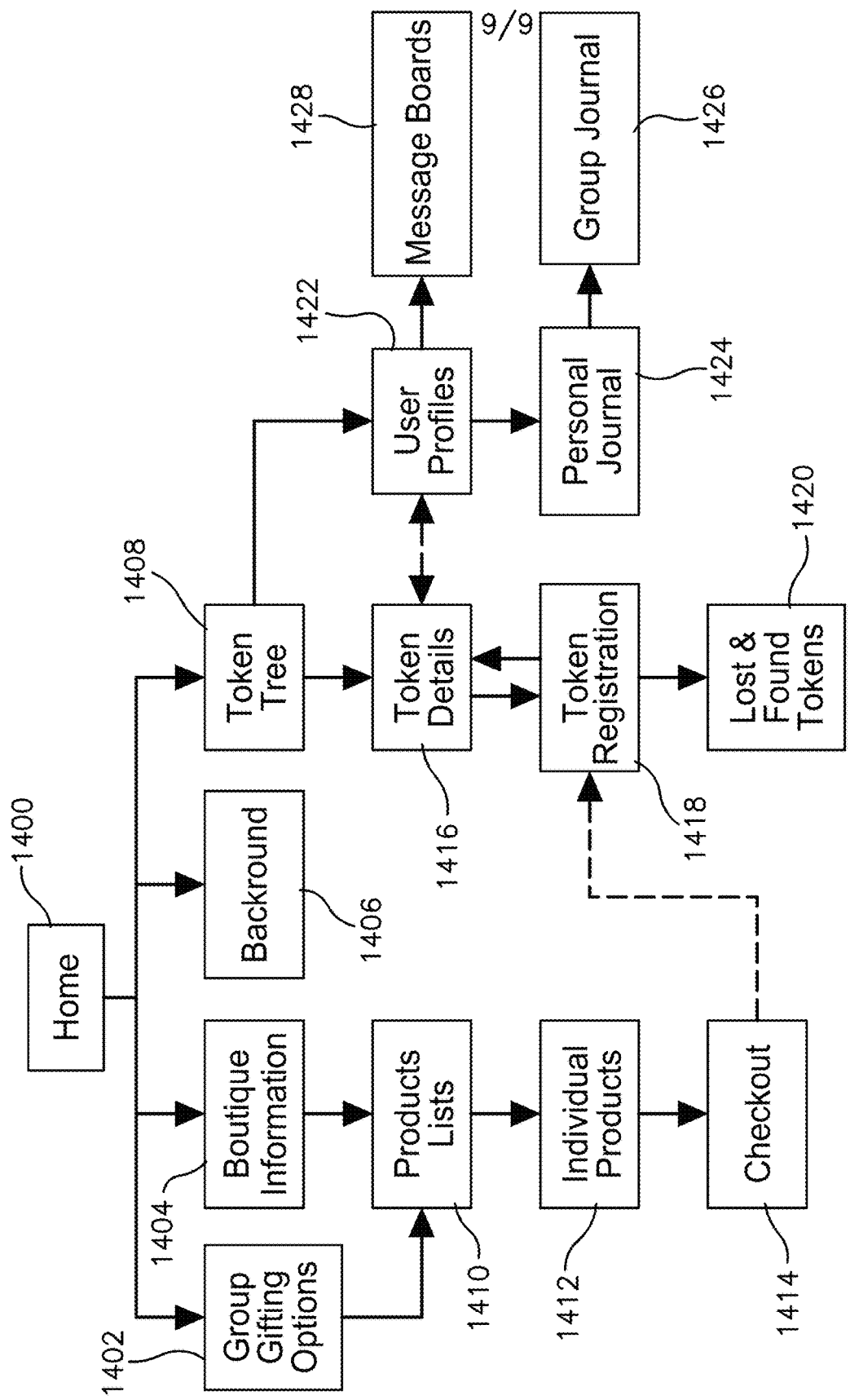
FIG. 14 is a software flow diagram showing various tracking and selling embodiments.

An example of the steps performed and displays presented by the electronic resource (e.g., by a server) is shown in FIG. 14. It should be appreciated that these various steps performed and displays presented may be performed in the order discussed or in any order. Further, some steps performed and displays presented may be omitted or others added. These steps performed and displays presented are therefore only exemplary to explain some embodiments of the invention. Some embodiments of the invention are directed to a method that utilizes one or more of the below discussed steps. Other embodiments of the invention may be directed to a server or other computing device that has a non-transitory computer readable medium. The non-transitory computer readable medium is configured to perform at least one of the below discussed steps and/or present at least one of the discussed displays.

In Step 1400, a home screen is presented to the user. The home screen may include navigation information about the other screens to be displayed and steps to be performed, such as those discussed below. The home screen may additionally or alternatively present links such as resources, journals, message boards, testimonials and reviews, forums, account information, contact information, return information, request information, donation information, partnership information, code of conduct, privacy policy, frequently asked questions, and other information. This information may be displayed directly or accessible via a displayed clickable links or other navigation elements.

In Step 1402, group gifting information is displayed to the user. There are various types of group gifting, either or both of which may be utilized in various embodiments of the invention. The first type is group-to-single gifting, in which a plurality of donors donate toward a single or set number of tokens 12 and/or token mounts 14. This may allow others who are aware that a certain person is grieving to assist in that grieving process by giving toward acquiring a mounted token system 10.

The second type is single-to-group gifting, in which a single or set number of people purchase for a plurality of recipients. Group gifting information can include purchase information regarding sets of tokens 12 and/or token mounts 14. As an example, the tokens 12 purchased in a group gifting scenario may have sequential, specialized, or otherwise associated tracking indicators. As another example, the tokens 12 purchased in a group gifting scenario may have a common aesthetic design on the anterior side 18 of the token 12. Thus, the tokens 12 purchased may be identical, similar, or otherwise associated, while allowing for the token mount 14 to be any of various styles, designs, and types. As another example, gift cards or other stored value cards may be purchased, pledges may be made, and other assistance may be provided to help the user (or another) purchase at least one component of the mounted token system 10.

A third type is group-to-group gifting, which is some combination of the above mentioned types.

In Step 1404, boutique information is displayed to the user. The boutique information may include information related to available products. For example, this may include an infographic on how the token 12 and token mount 14 work together. As another example, this may include a categorization of the various tokens 12, token mounts 14, and other products. Example categories could include target gender, target demographics, token mount 14 type, and other categorizations.

In Step 1406, background information may be presented to the user. The background information could include information on the grieving process (or other processes for which embodiments of the invention are configured to assist). The background information may include examples of how the tokens 12 and token mounts 14 are purchased, gifted, and otherwise transferred between wearers (such as was shown and described regarding FIG. 13). The background information may further include company history information, mission, vision, assistance, and other information.

In Step 1408, a token tree is presented. A token tree shows the lineage of one, some, many, most, or all tokens 12 that have been associated with users. The token tree may include direct passing relationships, indirect associations, geographic associations, timeline associations, or other groupings of tokens 12 and/or users. The token tree may, in part or entirely, be viewable to the public. For example, the user may mouse over, select, or otherwise indicate a certain token 12 on the token tree. The token tree may then show additional details for the token 12, as discussed below.

In Step 1410, as a component of or a continuation of the group gifting options and/or boutique information discussed above in Steps 1402 and 1404, respectively, product lists may be displayed to the user. The product list may show various tokens 12 for sale, such as those of various aesthetic designs, those of various shapes and sizes (although, in some embodiments as discussed above, all tokens 12 may be of the same size and shape so as to facilitate transfer between various token mounts 14 for different users). The product list may show various token mounts 14 for sale, such as the various types discussed above. In Step 1412, individual product information may be displayed upon a selection or other indication of a certain product. The individual product information may include more information about that certain product, pricing information, shipping information, retailer information, and other information. In Step 1414, checkout information may be displayed upon the user selecting at least one product for purchase.

In Step 1416, as a component of or a continuation of the token tree, token details may be displayed. Token details may be publically available, privately available, or a combination thereof. Token details may include information related to current, subsequent, and intermediate wearers of the token 12, grief-inducing information for any or all of these wearers, demographic information for any or all of these wearers, timeline information (such as when received and passed), geographic information, token mount 14 information, and other information.

In Step 1418, at least a portion of the token details are populated by token registration. Token registration may be presented following the checkout procedure (because the tracking indicator of the purchased token 12 may be known, currently ascertainable, or ascertainable in the future). The token registration may also be presented as a stand-alone option, such as for consumers that purchased the token 12 and/or token mount 14 from another retailer. In Step 1420, a token "lost and found" may be displayed to the user. This allows users to report a found token, report a token lost, request a found token, or perform other tasks related to finding a token.

In Step 1422, user profiles are displayed. The user profile may include basic profile information about the user. This can include roles held by and performed by the user. The user profile may also be configured to allow management of the token or tokens 12 that are and/or were associated with the user. The user may also be permitted to transfer the token 12 electronically to another user (such as by an association of the tracking indicator). In Step 1424, a personal journal may be displayed. The personal journal may be publically available, privately available, or a combination thereof. The user may be able to set the journal settings, such as setting a default availability, inviting certain other users to view the journal. The user may also have a separate journal for each token 12, if applicable.

In Step 1426, the group journal may be displayed. The group journal may operate as an aggregator of public journal entries or all, some, or a certain set of users. The group journal may display the various public journal entries, organized in any of various methods (such as chronologically, sorted by tags, sorted by users, or other criteria). This may additionally or alternatively include journal entries for associated tokens (such as those purchased through the group gifting options discussed above), tokens along the same token tree, tokens associated with a common grief-inducer (either specifically or by type), or other associated tokens.

In Step 1428, the message board may be displayed. The message board may be a forum, discussion board, or the like. The message board may include various topics and subtopics for discussion, such as the various steps of the grieving process (or the various steps of other processes to which the various embodiments of the invention may be directed). This may allow the various users to discuss these steps, their journey therethrough, and other related topics. The message boards may be accessible to the general public, accessible to registered users, or accessible to registered users that also with at least one associated token.

The computer program of embodiments of the invention comprises a plurality of code segments executable by a computing device for performing the steps of various methods of the invention. The steps of the method may be performed in the order discussed, or they may be performed in a different order, unless otherwise expressly stated. Furthermore, some steps may be performed concurrently as opposed to sequentially. Also, some steps may be optional. The computer program may also execute additional steps not described herein. The computer program, system 10, and method of embodiments of the invention may be implemented in hardware, software, firmware, or combinations thereof, which broadly comprises server devices, computing devices, and a communications network.

The computer program of embodiments of the invention may be responsive to user input. As defined herein user input may be received from a variety of computing devices including but not limited to the following: desktops, laptops, calculators, telephones, smartphones, smart watches, video systems, camera systems, or tablets. The computing devices may receive user input from a variety of sources including but not limited to the following: keyboards, keypads, mice, trackpads, trackballs, pen-input devices, printers, scanners, facsimile, touchscreens, network transmissions, verbal/vocal commands, gestures, button presses or the like.

The server devices and computing devices may include any device, component, or equipment with a processing element and associated memory elements. The processing element may implement operating systems, and may be capable of executing the computer program, which is also generally known as instructions, commands, software code, executables, applications ("apps"), and the like. The processing element may include processors, microprocessors, microcontrollers, field programmable gate arrays, and the like, or combinations thereof. The memory elements may be capable of storing or retaining the computer program and may also store data, typically binary data, including text, databases, graphics, audio, video, combinations thereof, and the like. The memory elements may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), and the like, or combinations thereof. In addition to these memory elements, the server devices may further include file stores comprising a plurality of hard disk drives, network attached storage, or a separate storage network.

The computing devices may specifically include mobile communication devices (including wireless devices), work stations, desktop computers, laptop computers, palmtop computers, tablet computers, portable digital assistants (PDA), smart phones, and the like, or combinations thereof. Various embodiments of the computing device may also include voice communication devices, such as cell phones and/or smart phones. In preferred embodiments, the computing device will have an electronic display operable to display visual graphics, images, text, etc. In certain embodiments, the computer program facilitates interaction and communication through a graphical user interface (GUI) that is displayed via the electronic display. The GUI enables the user to interact with the electronic display by touching or pointing at display areas to provide information to the system 10.

The communications network may be wired or wireless and may include servers, routers, switches, wireless receivers and transmitters, and the like, as well as electrically conductive cables or optical cables. The communications network may also include local, metro, or wide area networks, as well as the Internet, or other cloud networks. Furthermore, the communications network may include cellular or mobile phone networks, as well as landline phone networks, public switched telephone networks, fiber optic networks, or the like.

The computer program may run on computing devices or, alternatively, may run on one or more server devices. In certain embodiments of the invention, the computer program may be embodied in a stand-alone computer program (i.e., an "app") downloaded on a user's computing device or in a web-accessible program that is accessible by the user's computing device via the communications network. As used herein, the stand-along computer program or web-accessible program provides users with access to an electronic resource from which the users can interact with various embodiments of the invention.

Execution of the computer program of embodiments of the invention performs steps of the method of embodiments of the invention. Because multiple users may be updating information stored, displayed, and acted upon by the computer program, information displayed by the computer program is displayed in real-time. "Real-time" as defined herein is when the processing element of the system 10 performs the steps less than every 1 second, every 500 milliseconds, every 100 milliseconds, or every 16 milliseconds.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A computerized method comprising:
   receiving, from a first user, information indicative of a tracking indicator;
   storing information indicative of the tracking indicator;
   receive, from a second user, information indicative of said tracking indicator;
   associating the first user with the second user based upon said tracking indicator, indicative that the token passed from the first user to the second user; and
   presenting, to the second user via a graphical user interface, a token chain indicative of the first user.

2. The computerized method of claim 1,
   wherein the tracking indicator is presented on a token configured to be worn in a first token mount by the first user and a second token mount by the second user.

3. The computerized method of claim 1, further comprising:
- associating a third user with the first user and the second user based upon said tracking indicator, indicative that the token passed from the second user to the third user; and
- presenting, to the third user via the graphical user interface, a token chain indicative of the first user and the second user.

4. The computerized method of claim 1, further comprising:
- presenting, to the first user, a token registration request;
- receiving, from the first user, a name of the first user to be associated with the received tracking indicator.

5. The computerized method of claim 4, further comprising:
- receiving, from the first user, a geographic location of the first user to be associated with the received tracking indicator.

6. The computerized method of claim 5, wherein the token chain includes the name and geographic location of the first user.

7. The computerized method of claim 1, further comprising:
- presenting, to the second user, a token registration request;
- receiving, from the second user, a name of the second user to be associated with the received tracking indicator; and
- receiving, from the second user, a geographic location of the second user to be associated with the received tracking indicator,
- wherein the token chain includes the name and geographic location of the first user and the second user.

* * * * *